United States Patent

Daido et al.

[11] Patent Number: 5,634,627
[45] Date of Patent: Jun. 3, 1997

[54] CONTROLLER

[75] Inventors: Kunihiko Daido; Kazuhiro Yoshikawa; Shuhei Ogawa, all of Osaka, Japan

[73] Assignee: Fujikin Incorporated, Osaka, Japan

[21] Appl. No.: 555,031

[22] Filed: Nov. 8, 1995

[30] Foreign Application Priority Data

May 10, 1995 [JP] Japan .................. 7-111497

[51] Int. Cl.$^6$ .................. F16K 31/122
[52] U.S. Cl. .................. 251/335.3; 251/63.6
[58] Field of Search .................. 251/335.3, 63.6

[56] References Cited

U.S. PATENT DOCUMENTS

| | | | |
|---|---|---|---|
| 1,992,902 | 2/1935 | McIntosh | 251/335.3 |
| 4,201,366 | 5/1980 | Danko et al. | 251/335.3 |
| 4,309,022 | 1/1982 | Reinieke et al. | 251/63.6 |
| 4,515,344 | 5/1985 | Gemignani | 251/335.3 |
| 4,583,710 | 4/1986 | Adams et al. | 251/335.3 |
| 4,687,017 | 8/1987 | Dunko et al. | 251/335.3 |

FOREIGN PATENT DOCUMENTS

| | | |
|---|---|---|
| 0623773A2 | 11/1994 | European Pat. Off. . |
| 2.166.480 | 8/1973 | France . |
| 2553163 | 6/1977 | Germany . |
| 3016080 | 11/1980 | Germany . |
| 2-201510 | 8/1990 | Japan . |
| 201064 | 7/1994 | Japan .................. 251/335.3 |
| 464628 | 12/1968 | Switzerland . |
| WO92/15813 | 9/1992 | WIPO . |

OTHER PUBLICATIONS

Drawing No. 1010483, Kammer Ventile Jan. 19, 1995.
Drawing No. 950419, Apr. 19, 1995.

*Primary Examiner*—A. Michael Chambers
*Attorney, Agent, or Firm*—Armstrong, Westerman, Hattori, McLeland & Naughton

[57] ABSTRACT

An actuator comprises a valve case opened upward, a gas-driven actuator having a fixed portion provided on the valve case and fixed thereto and an operating portion movable upward and downward by a drive gas when the gas flows in or out, a valve stem extending upward from inside the valve case to above the case and having its upper end fixed to the operating portion of the actuator, and a valve element provided on the lower end of the valve stem. A valve case fluid seal bellows and an actuator gas seal bellows are connected between the valve stem and the actuator fixed portion and between the actuator fixed portion and operating portion, respectively. A vacuum is contained in a closed space formed by the valve stem, fluid seal bellows, actuator fixed portion, gas seal bellows and actuator operating portion. The variations in the internal pressure of the closed space due to variations in the ambient temperature are much smaller than the pressure of the drive gas, so that the flow rate of fluid remains unchanged by the variations in the ambient temperature.

2 Claims, 1 Drawing Sheet

CONTROLLER

BACKGROUND OF THE INVENTION

The present invention relates to a controller suitable for use at low temperatures or high temperatures.

For example as a controller for use at low temperatures as attached to a vacuum tank, heretofore known is an axially elongated valve which comprises a valve case to be disposed inside the tank, an actuator to be provided outside the tank, and an extension pipe for holding the valve case in communication with the actuator.

This valve has the problem that the extension pipe needs to be given a particular length in conformity with the design of piping when the valve is to be fabricated, further making the vacuum tank larger in size.

To overcome this problem, a controller has been proposed which is adapted for use with its actuator entirely placed in the vacuum tank.

The proposed controller comprises a valve case opened upward, a gas-driven actuator having a fixed portion provided on the valve case and fixed thereto and an operating portion movable upward and downward by a drive gas when the gas flows in or out, a valve stem extending upward from inside the valve case to above the case and having its upper end fixed to the operating portion of the actuator, and a valve element mounted on the lower end of the valve stem. The controller has a valve case fluid seal bellows extending between and attached to the valve stem and the fixed portion of the actuator, and an actuator gas seal bellows extending between and attached to the fixed portion and the operating portion of the actuator.

The conventional controller described has a closed space formed by the valve stem, fluid seal bellows, actuator fixed portion, gas seal bellows and actuator operating portion, and air is confined in this closed space. The pressure of the air in the closed space varies with the variation of the ambient temperature, consequently moving the valve stem. Use of the controller as a flow regulating valve therefore involves the fatal problem that the movement of the valve stem varies the flow rate of fluid through the valve case. The same problem is encountered also in the case where the controller is used at high temperatures.

SUMMARY OF THE INVENTION

An object of the present invention is to provide a controller which is operable free of variations in the rate of flow of the fluid passing therethrough due to variations in the ambient temperature.

The present invention provides a controller which comprises a valve case opened upward, a gas-driven actuator having a fixed portion provided on the valve case and fixed thereto and an operating portion movable upward and downward by a drive gas when the gas flows in or out, a valve stem extending upward from inside the valve case to above the case and having its upper end fixed to the operating portion of the actuator, and a valve element provided on the lower end of the valve stem, the controller having a valve case fluid seal bellows extending between and attached to the valve stem and the fixed portion of the actuator, and an actuator gas seal bellows extending between and attached to the fixed portion and the operating portion of the actuator to form a closed space by the valve stem, the fluid seal bellows, the actuator fixed portion, the gas seal bellows and the actuator operating portion, the controller being characterized in that the closed space contains a vacuum. Since the closed space is vacuum which space is formed by the valve stem, fluid seal bellows, actuator fixed portion, gas seal bellows and actuator operating portion, the variations in the internal pressure of the closed space due to variations in the ambient temperature are much smaller than the pressure of the drive gas. For this reason, the flow rate remains unchanged by the variations in the ambient temperature. Further with the conventional axially elongated valve, the extension pipe increases the distance of conduction of heat for thermal insulation, whereas with the controller of the invention, thermal insulation is effected by the closed vacuum space, which therefore ensures a diminished heat loss during use at low or high temperatures.

The fluid seal bellows and the gas seal bellows are joined respectively to the valve stem and the actuator fixed portion, and the actuator fixed portion and operating portion preferably by electron beam welding. The closed space can be made vacuum by joining the fluid seal bellows and the gas seal bellows to the valve stem and the actuator fixed portion, and to the actuator fixed portion and operating portion, respectively. The controller is therefore easy to make.

DESCRIPTION OF THE PREFERRED EMBODIMENT

Figure 1:
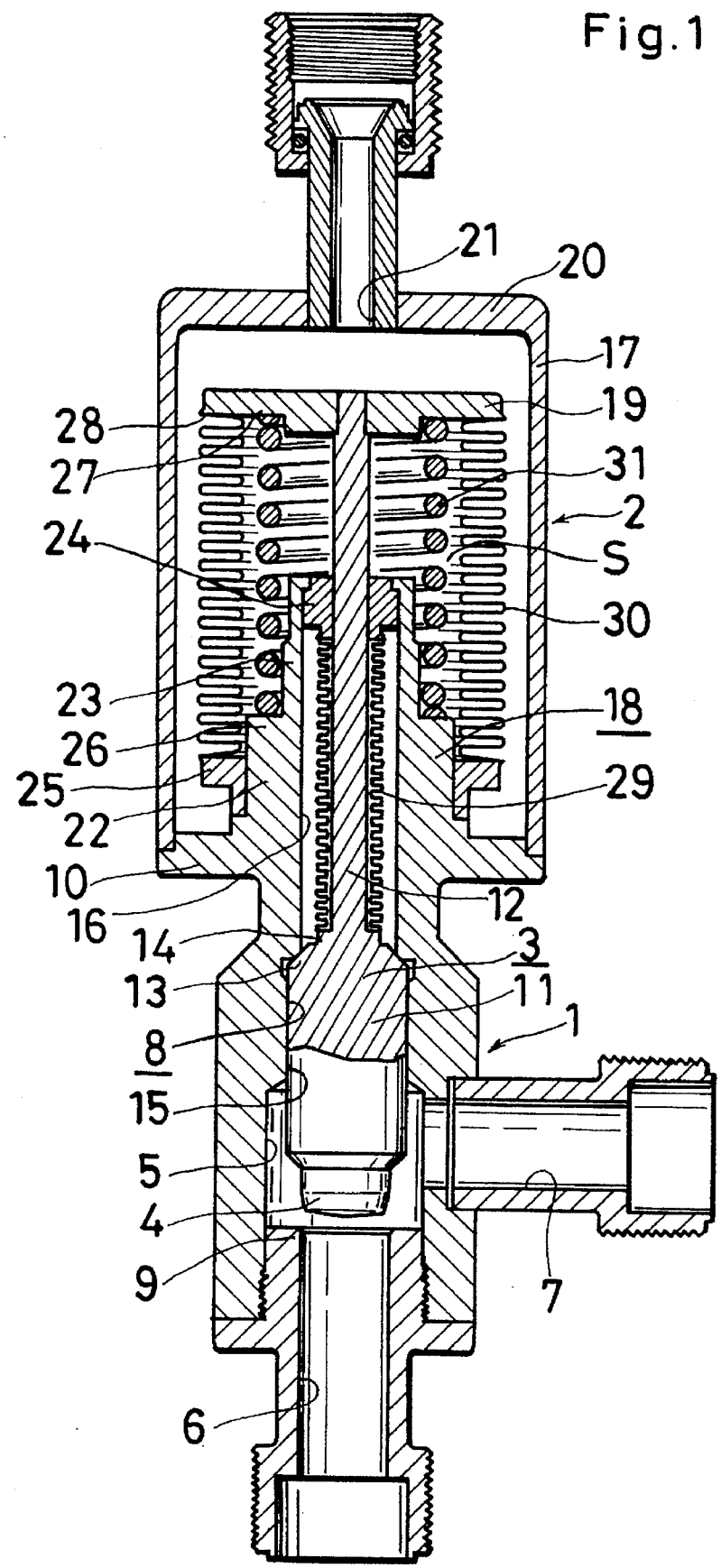
FIG. 1 is a view in vertical section showing a controller embodying the invention.

An embodiment of the present invention will be described below with reference to the drawing.

FIG. 1 shows a controller embodying the invention. The controller comprises a valve case 1 opened upward, a gas-driven actuator 2 provided on the valve case 1, a halve stem 3 extending upward from inside the valve case 1 to above the case 1 and forcibly movable downward by a drive gas when the gas flows into the actuator 2, and a valve element 4 provided at the lower end of the valve stem 3.

The valve case 1 has a valve chamber 5, a fluid inlet channel 6 communicating with the valve chamber 5 and opened downward, a fluid outlet channel 7 communicating with the valve chamber 5 and opened laterally, and a valve stem guide bore 8 extending from the top central portion of the case to the valve chamber 5. At the location where the fluid inlet channel 6 joins the valve chamber 5, the inner periphery of the case provides a valve seat 9. The valve case 1 is formed with a flange 10 at its upper portion.

The valve stem 3 comprises a large stem portion 11 inside the valve case 1 and a small stem protion 12 extending upward from the large stem portion 11. The large stem portion 11 has a frustoconical upper end. A bellows retaining annular stepped protion 14 is formed between the frustoconical portion 13 and the small stem portion 12.

The stem guide bore 8 comprises a large bore portion 15 having the same diameter as the large stem portion 11 and a small bore portion 16 having a larger diameter than the small stem portion 12. In the absence of a flow of drive gas into the actuator 2, the frustoconical portion 13 is in bearing contact with the lower edge of the small bored portion 16.

The actuator 2 comprises a casing 17 in the form of a cap, a cylindrical fixed portion 18 integral with the flange 10 of the valve case 1 and positioned in an inside lower portion of the casing 17, and a disklike operating portion 19 secured to the upper end of the valve stem 3 and movable by the pressure of the drive gas. The casing 17 has a top wall 20 formed with an inlet 21 for the drive gas.

The cylindrical fixed portion 18 comprises a large cylinder part 22 close to the flange 10 of the valve case 1, a small cylinder part 23 extending upward from the large cylinder part 22, a bellows retaining small ring 24 fixedly fitted in the upper end of the small cylinder part 23, and a bellows retaining large ring 25 fixedly fitted around the large cylinder part 22 near its lower end. The large cylinder part 22 and the small cylinder part 23 have an inside diameter equal to the diameter of the small bore portion 16 of the stem guide bore 8. The inside diameter of the small ring 24 is equal to the diameter of the small stem portion 12 of the valve stem 3. A lower spring retaining part 26 is formed between the large cylinder part 22 and the small cylinder part 23.

The outside diameter of the disklike operating portion 19 is equal to the outside diameter of the large ring 25. The lower surface of the operating portion 19 is formed with an upper spring retaining part 27 corresponding to the spring retaining part 26 of the fixed portion 18, and a bellows retaining part 28 continuous with the part 27 and positioned externally thereof.

A valve case fluid seal bellows 29 having a small diameter extends between, and is attached to, the small ring 24 and the annular stepped portion 14 of the valve stem 3. A drive gas seal bellows 30 having a large diameter extends between, and is attached to, the large ring 25 and the bellows retaining part 28 of the operating portion 19. Consequently, a closed space S is formed by the valve stem 3, fluid seal bellows 29, actuator fixed portion 18, gas seal bellows 30 and actuator operating portion 19. A coiled compression spring 31 extends between, and is attached to, the upper spring retaining part 27 and the lower spring retaining part 28.

The bellows 29, 30 of small and large diameters are secured in place by electron beam welding conducted in a high vacuum of $10^{-3}$ to $10^{-4}$ torr, whereby the closed space S formed by the actuator 2, valve stem 3, bellows 29 and bellows 30 is made to contain a high vacuum of $10^{-3}$ to $10^{-4}$ after the welding. Thus, the high vacuum can be readily realized.

The electron beam welding for securing the bellows 29, 30 may be low-vacuum electron beam welding effected with the valve placed in a vacuum of $10^{-1}$ to $10^{-2}$ torr. Insofar as the bellows are welded with the valve placed in a vacuum, also usable is other method, such as laser beam welding performed in a vacuum chamber.

When the valve is brought out of the vacuum chamber into the atmosphere after the welding, the operating portion 19, that is, the valve stem 3, comes to rest with a balance established between the force exerted on the operating portion 19 by the atmospheric pressure and the elastic force of the compression spring 31. In this state, the valve stem 3 is tested for stroke characteristics under drive pressure at ordinary temperature.

With the controller wherein the closed space S contains a vacuum, the variations in the internal pressure of the space S due to variations in the ambient temperature are much smaller than the pressure of the drive gas and therefore will not move the valve stem 3. This prevents leakage of the fluid and the variation of the fluid flow rate. Furthermore, the result obtained by testing the valve stem 3 for stroke characteristics under the drive pressure at ordinary temperature can be used as it is when the controller is used at high temperatures or low temperatures. With the closed vacuum space S provided between the fluid inside the valve case 1 and the drive gas, the heat-insulating effect of the vacuum eliminates the variations of the drive gas pressure due to variations in the temperature of the fluid in the valve case 1. The closed vacuum space S diminishes the transfer of heat without using an extension pipe to increase the distance of heat conduction for thermal insulation. This serves to reduce the loss that heat penetrates into the controller from outside when it is used at low temperatures and to reduce the loss that heat escapes to the outside when the controller is used at high temperatures.

Although the foregoing embodiment is a controller of the normally open type wherein the fluid channel is closed by the introduction of the drive gas, the same advantages as above are available also with the controller of the normally closed type wherein the fluid channel is opened by the introduction of the drive gas, by evacuating the closed space formed by the actuator, valve stem, bellows of small diameter and bellows of large diameter.

What is claimed is:

1. A controller comprising a valve case opened upward, a gas-driven actuator having a fixed portion provided on the valve case and fixed thereto and an operating portion movable upward and downward by a drive gas when the gas flows in or out, a valve stem extending upward from inside the valve case to above the case and having its upper end fixed to the operating portion of the actuator, and a valve element provided on the lower end of the valve stem, the controller having a valve case fluid seal bellows extending between and attached to the valve stem and the fixed portion of the actuator, and an actuator gas seal bellows extending between and attached to the fixed portion and the operating portion of the actuator to form a closed space by the valve stem, the fluid seal bellows, the actuator fixed portion, the gas seal bellows and the actuator operating portion, the controller being characterized in that the closed space contains a vacuum.

2. A controller as defined in claim 1 wherein the fluid seal bellows and the gas seal bellows are joined to the valve stem and the fixed portion of the actuator, and to the fixed portion and the operating portion of the actuator, respectively, by electron beam welding.

* * * * *